US012619366B2

(12) United States Patent
Shang et al.

(10) Patent No.: US 12,619,366 B2
(45) Date of Patent: May 5, 2026

(54) STORAGE APPARATUS AND RELATED PARTITIONED DATA MANAGEMENT METHOD

(71) Applicant: Huawei Technologies Co., Ltd., Shenzhen (CN)

(72) Inventors: Jie Shang, Hangzhou (CN); Jinwei Wang, Hangzhou (CN); Shaofeng Shen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/823,897

(22) Filed: Sep. 4, 2024

(65) Prior Publication Data

US 2024/0427508 A1 Dec. 26, 2024

Related U.S. Application Data

(63) Continuation of application No. PCT/CN2023/075459, filed on Feb. 10, 2023.

(30) Foreign Application Priority Data

Mar. 7, 2022 (CN) .......................... 202210223806.1

(51) Int. Cl.
*G06F 3/06* (2006.01)

(52) U.S. Cl.
CPC .......... *G06F 3/0629* (2013.01); *G06F 3/0604* (2013.01); *G06F 3/0679* (2013.01)

(58) Field of Classification Search
CPC .... G06F 3/0629; G06F 3/0604; G06F 3/0679; G06F 2212/7201; G06F 2212/7211; G06F 12/0246; G06F 3/0649; G06F 3/064; G06F 3/0616; G06F 3/0644; G06F 3/0631; G06F 3/0652; G06F 3/0658; G06F 3/0659
See application file for complete search history.

(56) References Cited

U.S. PATENT DOCUMENTS

2010/0153616 A1 6/2010 Garratt
2018/0090213 A1 3/2018 Peterson et al.

FOREIGN PATENT DOCUMENTS

CN 108733325 A 11/2018
WO 2021120137 A1 6/2021

OTHER PUBLICATIONS

Rachel Cummings et al., "Adaptive Learning with Robust Generalization Guarantees," arXiv:1602.07726v2 [cs.DS], Jun. 3, 2016, 28 pages.

*Primary Examiner* — Kevin Verbrugge
(74) *Attorney, Agent, or Firm* — Conley Rose, P.C.

(57) ABSTRACT

A storage apparatus includes a controller and M storage blocks, and M is an integer greater than 0. The controller is configured to: determine region configuration information, where the region configuration information includes a quantity N of storage regions, sizes of the storage regions, and maximum data retention time periods corresponding to the storage regions, and N is an integer greater than 1; divide the M storage blocks into N storage regions based on the quantity N of storage regions and the sizes of the storage regions, where each of the N storage regions includes one or more blocks; and configure a maximum data retention time period for each of the N storage regions based on the region configuration information.

20 Claims, 5 Drawing Sheets

STORAGE APPARATUS AND RELATED PARTITIONED DATA MANAGEMENT METHOD

CROSS-REFERENCE TO RELATED APPLICATIONS

This is a continuation of International Patent Application No. PCT/CN2023/075459 filed on Feb. 10, 2023, which claims priority to Chinese Patent Application No. 202210223806.1 filed on Mar. 7, 2022. The disclosures of the aforementioned applications are hereby incorporated by reference in their entireties.

TECHNICAL FIELD

The present disclosure relates to the field of computer technologies, and in particular, to a storage apparatus and a related partitioned data management method.

BACKGROUND

Currently, mainstream storage devices of computer servers are classified into two types: hard disk drive (HDD) and solid-state disk (SSD). Both the solid state disk and the hard disk drive are essentially hardware for data storage, and differ in storage medium. A hard disk drive uses a mechanical disk as a storage medium, and stores and reads data based on a mechanical structure between an actuator arm, a magnetic head, and a disk. A solid state disk uses a non-volatile memory flash (e.g., Not AND (NAND) flash) as a storage medium, and reads and writes data based on a quantity of charges in the memory, that is, through cell power-on and power-off, to implement data storage. With miniaturization of the solid state disk and continuous improvement of cost performance, more enterprise consumers and individual consumers use solid state disks to store data. Currently, the industry has explored use of NAND flash memories to replace or offload some expensive memories. For example, data in a mobile phone memory is temporarily stored in an SSD by using an algorithm, to reduce overheads of the mobile phone memory. However, this also poses a challenge to a service life of the SSD.

Based on a logical structure, the NAND flash may be divided into different blocks internally, and each block includes multiple pages. The NAND flash is read and written by pages, and is erased by blocks. That is, after a page in a block is written, the page cannot be directly erased. Instead, all data in the block that includes the page needs be erased before the page is written again. Therefore, in a garbage collection (GC) operation process of the NAND flash, data distribution needs to be managed on a flash translation layer (FTL), and valid data in a block is first backed up to another block before the block is erased. Data writing and erasing in this process increase hardware wear of the SSD, and reduce the service life of the SSD.

SUMMARY

A technical issue to be addressed in embodiments of the present disclosure is to provide a storage apparatus and a related partitioned data management method, to prolong a service life of a storage device.

According to a first aspect, an embodiment of the present disclosure provides a storage apparatus. The storage apparatus includes a controller and M storage blocks, and M is an integer greater than 0. The controller is configured to:

determine region configuration information, where the region configuration information includes a quantity N of storage regions, sizes of the storage regions, and maximum data retention time periods corresponding to the storage regions, and N is an integer greater than 1; divide the M storage blocks into N storage regions based on the quantity N of storage regions and the sizes of the storage regions, where each of the N storage regions includes one or more blocks; and configure a maximum data retention time period for each of the N storage regions based on the region configuration information.

In this embodiment of the present disclosure, a controller of an external memory (for example, an SSD) partitions storage blocks in the external memory to obtain different storage regions, and causes the different storage regions to have different maximum data retention time periods through software configuration, so that data having different retention time period requirements can be stored based on a feature of difference (that is, a feature of different maximum data retention time periods) between multiple storage regions (for example, data that needs to be retained for a long time is stored in a storage region with a long maximum data retention time period, and data that needs to be stored only for a short time is stored in a storage region with a short maximum data retention time period), so that storage characteristics of all storage regions can be fully utilized for data storage in the entire external memory, effectively improving utilization and prolonging a service life of an external memory. Specifically, the controller first divides, based on the configuration information, multiple blocks in the external memory into N storage regions. Further, because a maximum data retention time period of a storage block may be directly configured by using a parameter, the controller in the external memory may directly configure, by using software, maximum data retention time periods of multiple storage blocks included in different storage regions, to implement different maximum data retention time periods for different storage regions. However, in some technology, a target retention time period of to-be-stored data is not sensed. During data storage, to ensure that the data is not lost, all storage blocks in a storage device need to be configured according to a same and longest maximum data retention time period. However, because a storage block has a feature that a longer maximum data retention time period indicates a smaller quantity of program/erase cycles, all storage blocks need to be configured based on a smallest quantity of program/erase cycles. As a result, a storage capability of the storage block cannot be fully utilized, causing a waste of storage resources. However, in this embodiment of the present disclosure, because maximum data retention time periods of different storage regions are different, the controller may properly configure a quantity of program/erase cycles of a storage block based on a maximum data retention time period of the storage region, avoiding a waste of storage resources caused by storing all data according to a same and longest maximum data retention time period, improving utilization, and prolonging a service life of a storage device. In addition, in other technology, a field effect transistor feature of a storage block (that is, a higher programming voltage of a storage block indicates a longer data retention time period) is used. Based on the feature, a storage device may control a programming voltage of a storage block based on a target retention time period of to-be-stored data, so that the storage block stores data according to the target retention time period required by the to-be-stored data, improving utilization and prolonging a service life of a storage resource. However, because a programming voltage of a storage block is currently fixed in a production process, and cannot be adjusted by using software, the programming voltage of the storage block cannot be directly configured. Therefore, an additional requirement needs to be raised with a manufacturer, and overall costs increase. Embodiments of the present disclosure do not depend on internal implementation of a medium, and utilization and a service life of an external memory can be prolonged only based on a feature the medium, without raising an additional requirement with the manufacturer and without increasing costs. For example, maximum data retention time period requirements of different storage blocks are managed in a software manner based on a correlation between a data retention time period and a quantity of program/erase cycles of a storage medium, and a corresponding quantity of program/erase cycles may be calculated according to the retention time period requirement.

In a possible implementation, the controller is further configured to: receive the region configuration information sent by a host, or negotiate with the host for the region configuration information.

In this embodiment of the present disclosure, the region configuration information may be generated by the host according to a requirement of the host side and delivered to the storage device, or may be obtained through negotiation between the storage device and the host, so that the controller of the storage device can partition the storage blocks based on the configuration information. In addition, the controller may further implement, through software configuration, different maximum data retention time periods for different storage regions, so that the controller can store data based on multiple storage regions, improving utilization and prolonging a service life of a storage device (for example, an external memory).

In a possible implementation, the controller is further configured to: generate a corresponding region identifier for each storage region, and establish a mapping relationship between a maximum data retention time period of each storage region and a corresponding region identifier.

In this embodiment of the present disclosure, after dividing the multiple storage blocks into N storage regions based on the region configuration information, the controller in the storage device may further generate a region identifier for each storage region, so that one region identifier corresponds to one storage region. Subsequently, a mapping relationship between a maximum data retention time period of each storage region and a region identifier may be established, and then the mapping relationship between a maximum data retention time period of each of the N storage regions and a region identifier is sent to the host, so that when generating a write command, the host can select a target storage region based on the target retention time period of the to-be-stored data, and use a region identifier of the target storage region as region identification information.

In a possible implementation, the controller is further configured to: divide an available logical address space of the storage system into N logical address segments; and establish a mapping relationship between a maximum data retention time period of each storage region and one of the N logical address segments.

In this embodiment of the present disclosure, after dividing the multiple storage blocks into N storage regions based on the region configuration information, the controller in the storage device may further divide an available logical address space of the storage system into N logical address segments, so that one logical address segment corresponds to one storage region. Next, a mapping relationship between a maximum data retention time period of each storage region and a logical address segment may be established, and then the mapping relationship between a maximum data retention time period of each of the N storage regions and a logical address segment is sent to the host, so that when generating a write command, the host can select a target storage region based on the target retention time period of the to-be-stored data, and use a logical address segment of the target storage region as region identification information.

In a possible implementation, the controller is further configured to: receive a write command sent by the host, where the write command includes the to-be-stored data and target region identification information of the target storage region, the target storage region is one of the N storage regions, and each storage region corresponds to one piece of region identification information; and write the to-be-stored data into the target storage region based on the target region identification information in the write command.

In this embodiment of the present disclosure, after the controller in the storage device divides the multiple storage blocks into N storage regions based on the region configuration information, the write command received by the controller includes the to-be-stored data and the target region identification information, so that the controller may store the to-be-stored data in the target storage region based on the target region identification information, implementing data storage according to a target retention time period of to-be-stored data, avoiding a waste of storage resources caused by storing all data according to a same and longest maximum data retention time period, improving utilization, and prolonging a service life of an external memory.

In a possible implementation, the controller is further configured to: configure, based on the maximum data retention time period corresponding to each storage region, a maximum quantity of program/erase cycles of a block included in each storage region, where a shorter maximum data retention time period corresponding to a storage region indicates a larger maximum quantity of program/erase cycles of a block included in the storage region.

In this embodiment of the present disclosure, for a storage block, a shorter maximum data retention time period is configured, less hardware wear is caused to the storage block each time data is written. Therefore, a larger quantity of program/erase cycles may be configured, to improve utilization of the storage block. On the contrary, a longer maximum data retention time period is configured, greater hardware wear is caused to the storage block each time data is written. To ensure that to-be-stored data is not lost, a smaller quantity of program/erase cycles may be configured, to avoid reduced data stability due to excessive erasion of a storage block, improve utilization and prolong a service life of an external memory.

According to a second aspect, an embodiment of the present disclosure provides a processing apparatus, including a host. The host is configured to: generate region configuration information, where the region configuration information includes a quantity N of storage regions, sizes of the storage regions, and maximum data retention time periods corresponding to the storage regions, and N is an integer greater than 1; and send the region configuration information to a storage device, where the region configuration information is used by the storage device to divide M storage blocks into N storage regions, each storage region corresponds to one maximum data retention time period, and M is an integer greater than 1.

In this embodiment of the present disclosure, the host sends the region configuration information to an external memory (for example, a storage device), so that a controller of the external memory partitions storage blocks in the external memory to obtain different storage regions, and causes the different storage regions to have different maximum data retention time periods through software configuration, so that data having different retention time period requirements can be stored based on a feature of difference (that is, a feature of different maximum data retention time periods) between multiple storage regions (for example, data that needs to be retained for a long time is stored in a storage region with a long maximum data retention time period, and data that needs to be stored only for a short time is stored in a storage region with a short maximum data retention time period), so that storage characteristics of all storage regions can be fully utilized for data storage in the entire external memory, effectively improving utilization and prolonging a service life of the external memory.

In a possible implementation, the host is further configured to: select a target storage region from the N storage regions based on requirement information of to-be-stored data, where the requirement information includes a target retention time period expected by the to-be-stored data, the maximum data retention time period corresponding to the target storage region is greater than or equal to the target retention time period, and each storage region corresponds to one piece of region identification information; and send a write command to the storage device, where the write command includes the to-be-stored data and target region identification information of the target storage region.

In this embodiment of the present disclosure, the host selects, from multiple storage regions based on the target retention time period required by the to-be-stored data, a target region whose maximum data retention time period is greater than or equal to the target retention time period. Further, when the host delivers the write command, the write command needs to include the to-be-stored data, and needs to carry information used to identify the target storage region, so that after receiving the write command, the storage device can store the to-be-stored data in the target storage region, implementing data storage according to a target retention time period of to-be-stored data, avoiding a waste of storage resources caused by storing all data according to a same and longest maximum data retention time period, improving utilization, and prolonging a service life of an external memory.

In a possible implementation, the host is further configured to: determine the target retention time period based on a data type of the to-be-stored data, where the data type includes one or more of the following: temporary data generated in a process of using an application, stack data corresponding to an anonymous page of a background application, and data that can be discarded after an application is closed.

In this embodiment of the present disclosure, because the host has different requirements for accessing different types of data, data retention time periods required by different types of data may be different. Therefore, the host may determine the required target retention time period based on a data type of the to-be-stored data, and then determine the target storage region based on the target retention time period, so that the storage device can store the to-be-stored data in the target storage region after receiving the write command, implementing data storage according to a target retention time period of to-be-stored data, avoiding a waste of storage resources caused by storing all data according to a same and longest maximum data retention time period, improving utilization, and prolonging a service life of an external memory.

In a possible implementation, the host is specifically configured to: determine, from the N storage regions, a storage region whose maximum data retention time period is greater than or equal to the target retention time period as the target storage region; and send a write command to the controller, where the write command includes the to-be-stored data and a target region identifier corresponding to the target storage region.

In this embodiment of the present disclosure, after the host obtains a mapping relationship between a maximum data retention time period of each of the N storage regions and a region identifier, the host may determine, from the N storage regions based on the target retention time period of the to-be-stored data, a storage region whose maximum data retention time period is greater than or equal to the target retention time period as the target storage region. Further, when generating the write command for the to-be-stored data, the host may use the region identifier corresponding to the target storage region as the region identification information, so that after receiving the write command, the storage device can store the to-be-stored data in the target storage region based on the region identifier, implementing data storage according to a target retention time period of to-be-stored data, avoiding a waste of storage resources caused by storing all data according to a same and longest maximum data retention time period, improving utilization, and prolonging a service life of an external memory.

In a possible implementation, the write command further includes a target logical address, the target logical address is any address in an available logical address space of the host, a mapping relationship is present between the target logical address and a target physical address in the target storage region, and the target physical address is a physical address at which the to-be-stored data is actually stored in the target storage region.

In this embodiment of the present disclosure, if each storage region has a unique region identifier, the region identifier may be used as the region identification information. In this case, in addition to the to-be-stored data and the target region identification information, the write command further needs to include a logical address, so that the host can subsequently read data from the storage device based on the logical address.

In a possible implementation, the host is specifically configured to: determine, from the N storage regions, a storage region whose maximum data retention time period is greater than or equal to the target retention time period as the target storage region; determine a target logical address segment corresponding to the target region, and select a target logical address from the target logical address segment; and send a write command to the controller, where the write command carries the to-be-stored data and the target logical address.

In this embodiment of the present disclosure, after the host obtains a mapping relationship between maximum data retention time period of each of the N storage regions and a logical address segment, the host may determine, from the N storage regions based on the target retention time period of the to-be-stored data, a storage region whose maximum data retention time period is greater than or equal to the target retention time period as the target storage region. Further, when generating the write command for the to-be-stored data, the host may select an address, from the logical address segment corresponding to the target storage region, as the target logical address, and use the target logical address as the region identification information, so that after receiving the write command, the storage device can store the to-be-stored data in the target storage region based on the target logical address, implementing data storage according to a target retention time period of to-be-stored data, avoiding a waste of storage resources caused by storing all data according to a same and longest maximum data retention time period, improving utilization, and prolonging a service life of an external memory.

According to a third aspect, an embodiment of the present disclosure provides a partitioned data management method, which is applied to a storage apparatus. The storage apparatus includes M storage blocks, and M is an integer greater than 0. The method includes: determining region configuration information, where the region configuration information includes a quantity N of storage regions, sizes of the storage regions, and maximum data retention time periods corresponding to the storage regions, and N is an integer greater than 1; dividing the M storage blocks into N storage regions based on the quantity N of storage regions and the sizes of the storage regions, where each of the N storage regions includes one or more Blocks; and configuring a maximum data retention time period for each of the N storage regions based on the region configuration information.

In a possible implementation, the method further includes: receiving the region configuration information sent by a host, or negotiating with the host for the region configuration information.

In a possible implementation, the method further includes: generating a corresponding region identifier for each storage region, and establishing a mapping relationship between a maximum data retention time period of each storage region and a corresponding region identifier.

In a possible implementation, the method further includes: dividing an available logical address space of the storage system into N logical address segments; and establishing a mapping relationship between a maximum data retention time period of each storage region and one of the N logical address segments.

In a possible implementation, the method further includes: receiving a write command sent by the host, where the write command includes to-be-stored data and target region identification information of a target storage region, the target storage region is one of the N storage regions, and each storage region corresponds to one piece of region identification information; and writing the to-be-stored data into the target storage region based on the target region identification information in the write command.

In a possible implementation, the method further includes: configuring, based on the maximum data retention time period corresponding to each storage region, a maximum quantity of program/erase cycles of a block included in each storage region, where a shorter maximum data retention time period corresponding to a storage region indicates a larger maximum quantity of program/erase cycles of a block included in the storage region.

According to a fourth aspect, an embodiment of the present disclosure provides a partitioned data management method. The method includes: generating region configuration information, where the region configuration information includes a quantity N of storage regions, sizes of the storage regions, and maximum data retention time periods corresponding to the storage regions, and N is an integer greater than 1; and sending the region configuration information to a storage device, where the region configuration information is used by the storage device to divide M storage blocks into N storage regions, each storage region corresponds to one maximum data retention time period, and M is an integer greater than 1.

In a possible implementation, the method further includes: selecting a target storage region from the N storage regions based on requirement information of to-be-stored data, where the requirement information includes a target retention time period expected by the to-be-stored data, the maximum data retention time period corresponding to the target storage region is greater than or equal to the target retention time period, and each storage region corresponds to one piece of region identification information; and sending a write command to the storage device, where the write command includes the to-be-stored data and target region identification information of the target storage region.

In a possible implementation, the method further includes: determining the target retention time period based on a data type of the to-be-stored data, where the data type includes one or more of the following: temporary data generated in a process of using an application, stack data corresponding to an anonymous page of a background application, and data that can be discarded after an application is closed.

In a possible implementation, the sending a write command to the storage device includes: determining, from the N storage regions, a storage region whose maximum data retention time period is greater than or equal to the target retention time period as the target storage region; and sending a write command to the storage device, where the write command includes the to-be-stored data and a target region identifier corresponding to the target storage region.

In a possible implementation, the write command further includes a target logical address, the target logical address is any address in an available logical address space, a mapping relationship is present between the target logical address and a target physical address in the target storage region, and the target physical address is a physical address at which the to-be-stored data is actually stored in the target storage region.

In a possible implementation, the sending a write command to the storage device includes: determining, from the N storage regions, a storage region whose maximum data retention time period is greater than or equal to the target retention time period as the target storage region; determining a target logical address segment corresponding to the target region, and selecting a target logical address from the target logical address segment; and sending a write command to the storage device, where the write command carries the to-be-stored data and the target logical address.

According to a fifth aspect, the present disclosure provides a computer storage medium, where the computer storage medium stores a computer program. When the computer program is executed by a processor, the method according to the third aspect or any one of the implementations of the third aspect or the method according to the fourth aspect or any one of the implementations of the fourth aspect is implemented.

According to a sixth aspect, an embodiment of the present disclosure provides an electronic device. The electronic device includes a processor, and the processor is configured to support the electronic device in implementing a corresponding function in the partitioned data management method provided in the third aspect, or implementing a corresponding function in the partitioned data management method provided in the fourth aspect. The electronic device may further include a memory. The memory is configured to be coupled to the processor, and the memory stores program instructions and data that are necessary for the electronic device. The electronic device may further include a communication interface, used for communication between the electronic device and another device or a communication network.

According to a seventh aspect, the present disclosure provides a chip system. The chip system includes a processor configured to support an electronic device in implementing a function in the third aspect, and implementing a function in the fourth aspect, for example, generating or processing information in the partitioned data management method. In a possible design, the chip system further includes a memory, and the memory is configured to store program instructions and data that are necessary for an electronic device. The chip system may include a chip, or may include a chip and another discrete component.

According to an eighth aspect, the present disclosure provides a computer program, where the computer program includes instructions, and when the computer program is executed by a computer, the computer is caused to perform the method according to the third aspect or any one of the implementations of the third aspect, and perform the method according to the fourth aspect or any one of the implementations of the fourth aspect.

DESCRIPTION OF EMBODIMENTS

Figure 1A:
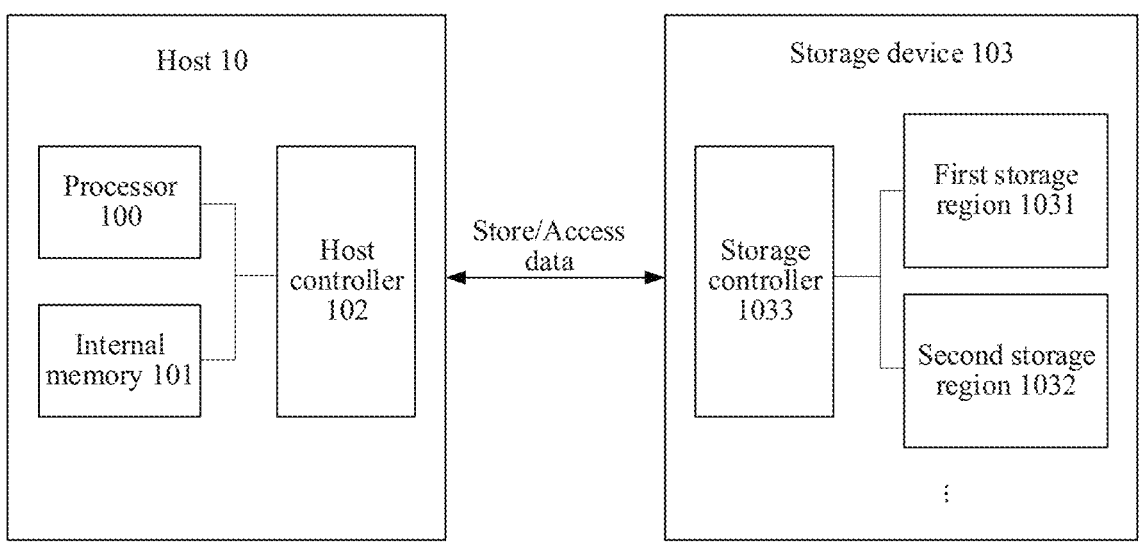
FIG. 1A is a diagram of a structure of a host and a storage device according to an embodiment of the present disclosure.

The following describes embodiments of the present disclosure with reference to accompanying drawings in embodiments of the present disclosure.

In the specification, claims, and accompanying drawings of the present disclosure, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that particular features, structures, or characteristics described with reference to this embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

First, some terms in embodiments of the present disclosure are briefly described.

(1) A NAND flash is a non-volatile storage medium. In other words, data can still be retained after power is off. The development goal is to reduce storage costs per bit and increase a storage capacity. Generally, the NAND flash is read and written by pages, and is erased by blocks. Due to the storage principle of the flash, when data is written into the flash, data (bit) has to be changed from 1 to 0. For erasion, all data (bit) has to be changed from 0 to 1. Therefore, modified data or new data needs to be written into an idle page that has been erased. Otherwise, the data will be disordered.

(2) An SSD is usually referred to as a solid state disk. The solid state disk is a hard disk made of solid state electronic memory chip arrays. An SSD includes a control unit and a storage unit (flash chip and dynamic random-access memory (DRAM) chip). The flash chip in the SSD usually uses the foregoing NAND flash chip as a storage unit. The solid state disk is the same as a common hard disk in terms of interface specification and definition, function, usage, and product shape and size, and is widely used in fields such as military, vehicles, industrial control, video surveillance, network monitoring, network terminals, electricity, medical care, aviation, and navigation devices.

(3) The flash file system (F2FS) is a storage architecture of files on an operating system, and is a new open-source flash file system specially designed for NAND-based storage devices. F2FS supports the Linux® operating system, and is suitable for NAND flash devices (such as a solid state disk, an embedded multimedia card (eMMC), and a secure digital (SD) card), that is, more suitable for present mobile devices.

(4) GC is a storage resource recycling method. When a file is deleted from an operating system (for example, Windows®), the operating system only marks the file in its internal file table to indicate that the file has been deleted. Because the NAND flash device cannot overwrite existing data, currently invalid data is still stored in the SSD. In this case, a large amount of invalid data is generated, which is also called data garbage. To improve utilization efficiency of the SSD, a controller of the solid state disk first copies all valid data (data that is still in use), writes the valid data into blank pages of different data regions, erases all data units in a current data region, and then starts to write new data into a data region that is just erased.

Based on the foregoing description, embodiments of the present disclosure provide a host and a storage device. Refer to FIG. 1A. FIG. 1A is a diagram of a structure of a host and a storage device according to an embodiment of the present disclosure. The host 10 may be any computing device that generates data, for example, various devices such as a server, a personal computer, a tablet computer, a mobile phone, a personal digital assistant, and an intelligent wearable device. The storage device 103 may be any non-volatile memory that provides a data storage/reading function for the host 10. In this embodiment of the present disclosure, the storage device 103 may be built in the host 10, or may be a device independent of the host 10. Alternatively, the storage device 103 and the host 10 may be located in a same electronic device. This is not specifically limited in the present disclosure. The host 10 or the storage device 103 may be specifically a chip or a chipset or a circuit board carrying a chip or a chipset. The chip or the chipset or the circuit board carrying a chip or a chipset may work with necessary software drivers. Details are as follows.

The host 10 may include a processor (central processing unit (CPU)) 100 and an internal memory 101. Optionally, the host 10 may further include a host controller 102, and further, may further include all physical components on an application processing side, such as a power supply, another input/output controller, and an interface that are not shown in FIG. 1A.

The processor 100 may run an operating system, a file system (such as F2FS), an application program, or the like, to control multiple hardware or software elements connected to the processor 100, and may process various data and perform operations. The processor 100 may load an instruction or data stored in the storage device 103 to the internal memory 101, and invoke an instruction or data that needs to be operated to the processor 100 for operation. After the operation is completed, the processor 100 temporarily stores a result in the internal memory 101, and stores, by using the host controller 102, an instruction or data that needs to be stored for a long time in the storage device 103. The processor 100 may include one or more processing units (also referred to as processing cores). For example, the processor 100 may include one or more of the following: a central processing unit (CPU), an application processing (AP) unit, a modem processing unit, a graphics processing unit (GPU), an image signal processing (ISP) unit, a video codec unit, a digital signal processing (DSP) unit, a baseband processing unit, a neural processing unit (NPU), and the like. Different processing units may be independent components, or may be integrated into one or more components. Optionally, a memory may be further disposed in the processor 100, and is configured to store instructions and data. In some embodiments, the memory in the processor 100 is a cache memory (Cache). The cache may store an instruction or data that is just used or cyclically used by the processor 100. If the processor 100 needs to use the instruction or the data again, the processor 100 may directly invoke the instruction or the data from the memory. This avoids repeated access, reduces waiting time of the processor 100, and improves system efficiency. Further, the processor 100 may alternatively be implemented as a system on chip (SoC).

The internal memory 101 is usually a volatile memory, and may also be referred to as a memory or a main memory. Content stored in the internal memory 101 is lost when power is off. The internal memory 101 in the present disclosure includes a readable and writable running memory, and is configured to: temporarily store operation data in the processor 100, and exchange data with the storage device 103 or another external memory. The internal memory 101 may serve as a storage medium for temporary data of an operating system or another running program. For example, an operating system running on the processor 100 invokes data that needs to be operated from the internal memory 101 to the processor 100 for operation. After the operation is completed, the processor 100 transfers a result.

The internal memory 101 may include one or more of the following: a DRAM, a static random-access memory (SRAM), a synchronous dynamic random-access memory (SDRAM), and the like. The DRAM further includes a double data rate (DDR) SDRAM, which is referred to as DDR, a double data rate 2 (DDR2) SDRAM, a double data rate 3 (DDR3) SDRAM, a low power double data rate 4 (LPDDR4) SDRAM, a low power double data rate 5 (LPDDR5) SDRAM, and the like.

The host controller 102 is configured to: manage and control communication between the host 10 and the storage device 103, and provide a standardized (for example, a universal flash storage (UFS) standard) interface for communication between the host 10 and the storage device 103. Specifically, the host controller 102 may transfer a command (for example, a write, read, or erase command) and data to the storage device 103 based on a request such as a read/write request sent by the processor 100, and feed back an event (for example, a command completion event, a command status event, or a hardware error event) to the host 10 based on a result of reading/writing data by the storage device 103. For a command or data sent from the processor 100, the host controller 102 may convert, through encapsulation, the command or the data into a data packet that supports a protocol, and the host controller 102 performs a reverse operation on data received by the host 10. Optionally, one host may support multiple host controllers, to support communication with storage devices using different protocols. In this embodiment of the present disclosure, the host controller 102 generates a write command in the present disclosure based on a protocol (for example, the UFS protocol) supported between the host 10 and the storage device 103, and may carry region identification information of data in the generated command, to indicate, to the storage device 103, a region in which the data is to be stored. For details, refer to the following specific description of a storage system and a partitioned data management method. Optionally, a function of the host controller 102 may also be integrated into the processor 100, that is, the processor 100 completes the foregoing function of the host controller 102. This is not specifically limited herein.

The storage device 103 may include multiple storage blocks. In this embodiment of the present disclosure, the multiple storage blocks may be partitioned, so that the storage device 103 includes at least a first storage region 1031 and a second storage region 1032. Further, the storage device 103 may further include a storage controller 1033. In this embodiment of the present disclosure, the first storage region 1031 and the second storage region 1032 have different storage performance, to separately store data having different performance requirements. That is, data retention time periods of blocks included in different storage regions are different.

The storage device 103 is a non-volatile memory, and content stored in the storage device 103 is not lost after power is off. The storage device 103 (which may include the first storage region 1031, the second storage region 1032, and the like) may be configured to store, for a long time, instructions and data related to running of the host 10, for example, a startup program, an operating system, an application program, and data. The processor 100 in the host 10 cannot directly read an instruction and data in the storage device 103, and cannot directly write an instruction or data into the storage device 103. Therefore, when executing a read (or load) command, the processor 100 actually temporarily loads, by using the host controller 102, to-be-read content (including an instruction and/or data) stored in the storage device 103 to the internal memory 101, and then the processor 100 reads the to-be-read content from the internal memory 101. When executing a write (that is, storage) command, the processor 100 actually first temporarily writes to-be-stored data (including an instruction and/or data) into the internal memory 101, and then stores the to-be-stored data from the internal memory 101 to the storage device 103 by using the host controller 102. If an available service life of the storage device 103 is short, performance of the host 10 is affected. Therefore, how to prolong the service life of the storage device 103 is an urgent problem to be resolved. In the present disclosure, storage blocks in the storage device 103 are partitioned, that is, the storage device 103 includes at least the first storage region 1031 and the second storage region 1032, and a maximum data retention time period of the first storage region 1031 is different from that of the second storage region 1032. Therefore, in embodiments of the present disclosure, data of different retention time periods may be stored in corresponding storage regions based on a target retention time period required by to-be-stored data, that is, partitioned management is performed on host data. This avoids a waste of storage resources caused by storing all data according to a same retention time period, and prolongs the service life of the storage device 103 without increasing costs, reducing available space, and affecting reliability of critical data of the host. Further description is to be made in subsequent embodiments, and details are not described herein again.

The storage device 103 may include one or more of a flash (for example, a NAND flash or a Not OR (NOR) flash), a UFS, an eMMC, a universal flash storage-based multi-chip package (uMCP) storage, an embedded multimedia card multi-chip package (eMCP) storage, an SSD, and the like. In a possible implementation, the storage device 103 includes at least the first storage region 1031 and the second storage region 1032, and both the first storage region 1031 and the second storage region 1032 may include one or more of the following: a single-level cell (SLC) storage region, a multi-level cell (MLC) storage region, a triple-level cell (TLC) storage region, a quadruple-level cell (QLC) storage region, or a penta-level cell (PLC) storage region. However, a maximum data retention time period configured for the first storage region 1031 is different from that configured for the second storage region 1032. Further, the storage device 103 may further include another storage medium such as an HDD.

Figure 1B:
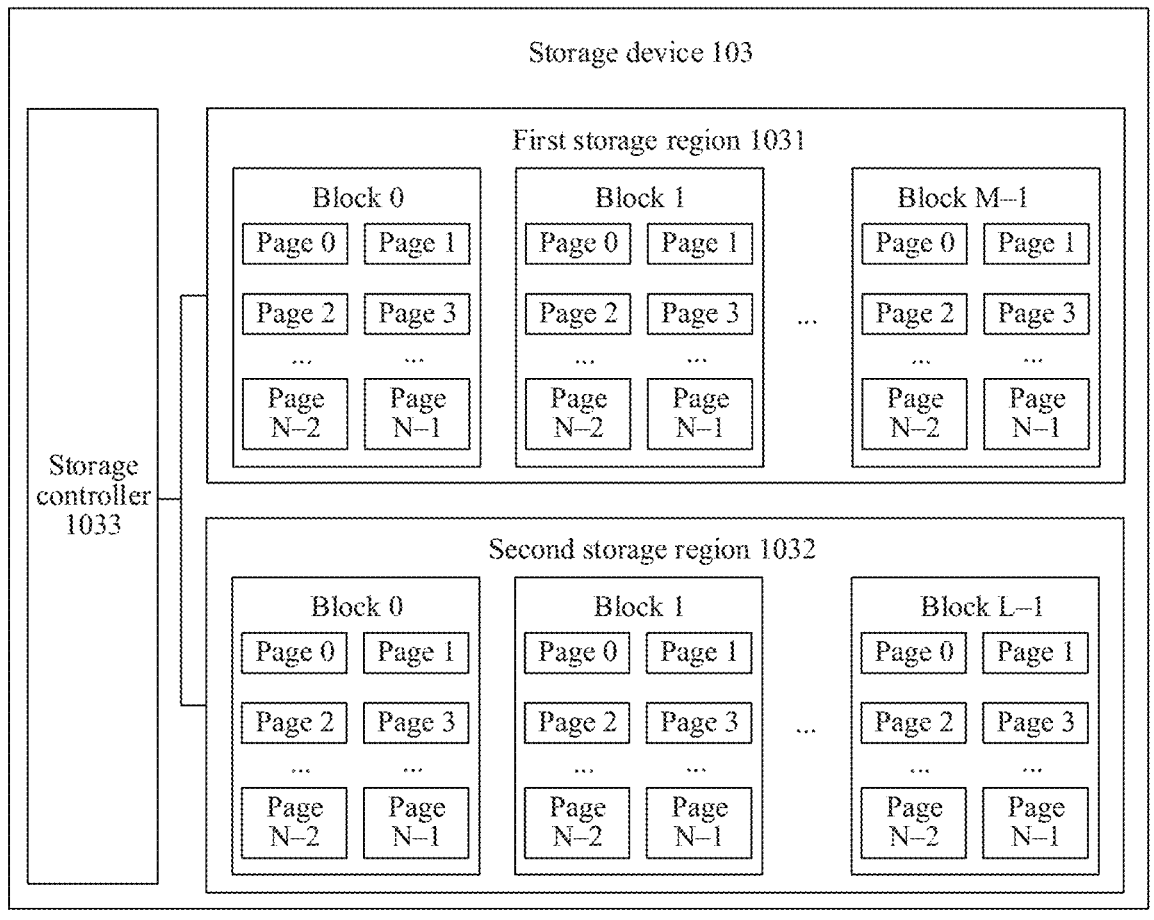
FIG. 1B is a diagram of a structure of a storage device according to an embodiment of the present disclosure.

For example, as shown in FIG. 1B, FIG. 1B is a diagram of a structure of a storage device according to an embodiment of the present disclosure. A first storage region 1031 may include M blocks, each block includes N pages, and each page includes a specific quantity of cells. All cells in all pages of all blocks in the first storage region 1031 may be one or more of the following: an SLC, an MLC, or a TLC. This is not limited herein. Similarly, a second storage region may include L blocks, each block includes N pages (a quantity of pages may not be N herein), and each page includes a specific quantity of cells. All cells in all pages of all blocks in the second storage region 1032 may be one or more of the following: an SLC, an MLC, or a TLC. This is not limited herein. Further, the storage medium may be configured by using software, so that blocks in different storage regions have different maximum data retention time periods.

It should be noted that a page is a minimum unit for addressing in a NAND flash, that is, a minimum unit of read/write. The quantity of pages in a block varies according to the specifications of different vendors, and the page size also varies. For example, one block has 1024 pages, and a size of each page is (16 kilobytes (KB)+2208 bytes (B)), where 16 KB is a data region for data storage, and 2208 B is a metadata region for metadata storage. For example, 16 KB is used to store one or more pieces of target data in an application, and 2208 B is used to store region identification information respectively corresponding to the one or more pieces of target data. Erase performance of the SLC is similar to that of the MLC, and read performance (including a read speed), write performance (including a write speed), storage performance (including a storage life), and the like of an SLC flash are all better than those of an MLC/TLC flash.

The storage controller 1033 is an interface device between the host 10 and the storage device 103. A main function of the storage controller 1033 is to perform interface conversion, convert a read, write, delete, or another command sent by the host 10 (for example, the host controller in the host 10) into a signal that can be identified by the storage device 103, and further complete address decoding between the host 10 and the storage device 103 (for example, mapping between a logical address of the host 10 and a physical address in the storage device 103), data format conversion (for example, data bit width), and the like. In conclusion, the storage controller 1033 may perform, according to a specific time sequence rule, necessary control over access to the storage device 103 in which the storage controller 1033 is located, including control over an address signal, a data signal, and various command signals, so that the host 10 can use a storage resource in the storage device 103 according to a requirement. For example, the storage controller 1033 receives and parses a read command, a write command, or the like sent by the host controller 102 in the host 10, parses, based on a logical address of data carried in the read command, the write command, or the like, the logical address of the data into a physical address according to a fixed address mapping relationship, to search for a location of to-be-read or to-be-written data, and finally sends a control signal corresponding to the command to the first storage region 1031 or the second storage region 1032.

It should be noted that a computer program used to implement any partitioned data management method in the present disclosure (referred to as a partitioned data management program, which may include related instructions and related data, and details are not repeated below) relates to and includes multiple functions. Some of the functions are for a process of determining a target retention time period of to-be-stored data by the host 10 side and carrying region identification information of the to-be-stored data in a write command. Some other functions are for a process of partitioning storage blocks by the storage device 103 side, and a process of receiving and storing to-be-store data. A function of target retention time period prediction may be implemented by a partitioned data management program in an operating system run by the processor 100. A function of retention management after the target retention time period is determined may be implemented by a file system (for example, F2FS) in the operating system run by the processor 100. Storage block partitioning and data storage may be implemented by a control program run by the storage controller 1033. Finally, an available life of the storage device 103 is improved by using the multiple functions included in the foregoing partitioned data management program. Further description is to be made in subsequent embodiments, and details are not described herein again.

It may be understood that the structure of the host 10 or the storage device 103 in FIG. 1A or FIG. 1B is merely some example implementations provided in embodiments of the present disclosure. The structures of the host 10 and the storage device 103 in embodiments of the present disclosure include but are not limited to the foregoing implementations.

It may be further understood that the processor 100 may communicate with the internal memory 101, the host controller, and the storage device 103 by using a system bus, or may communicate with each other in another connection manner. This is not specifically limited in embodiments of the present disclosure. The schematic structure in this embodiment of the present disclosure does not constitute a specific limitation on the host 10 or the storage device 103. In some other embodiments of the present disclosure, the host 10 or the storage device 103 may include more or fewer components than those shown in the figure, or some components may be combined, or some components may be split, or different component arrangements may be used. The components shown in the figure may be implemented as hardware, software, or a combination of software and hardware.

The following describes embodiments of the present disclosure with reference to the accompanying drawings in embodiments of the present disclosure.

Figure 2:
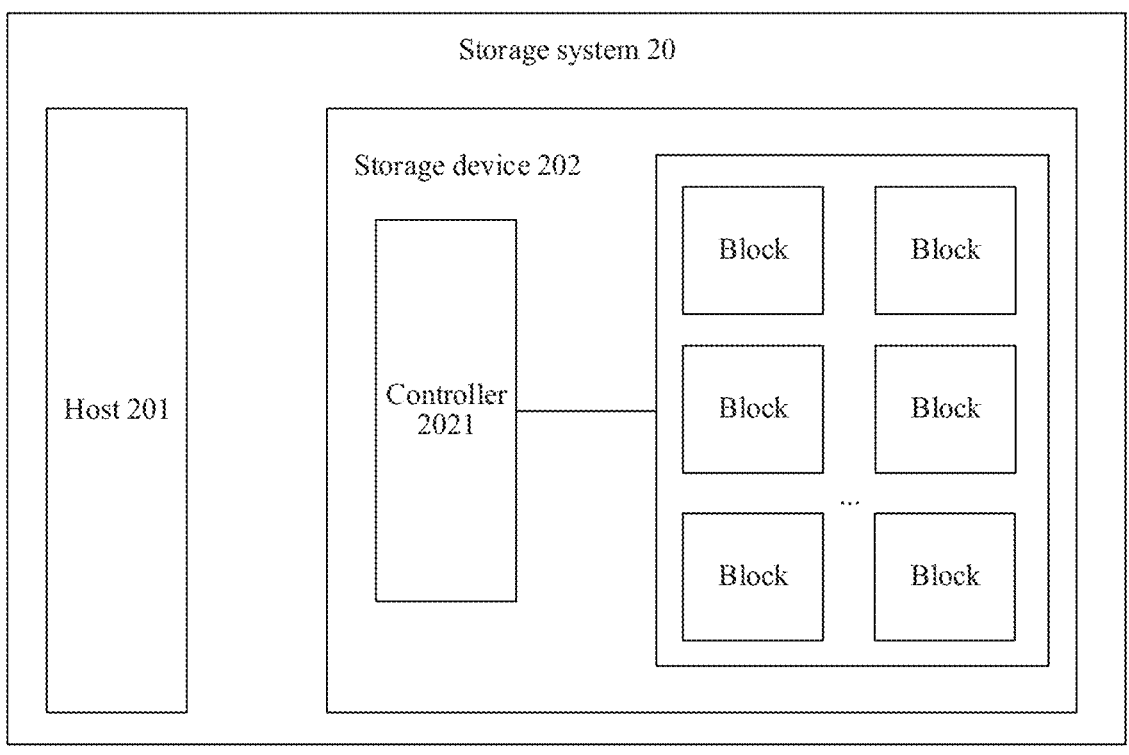
FIG. 2 is a diagram of a storage system according to an embodiment of the present disclosure.

Refer to FIG. 2. FIG. 2 is a diagram of a storage system according to an embodiment of the present disclosure. The following describes in detail a storage apparatus and a processing apparatus in an embodiment of the present disclosure with reference to FIG. 2. As shown in FIG. 2, the storage system 20 includes a host 201 (which may serve as a processing apparatus) and a storage device 202 (which may serve as a storage apparatus). In addition, the storage device 202 further includes a controller 2021 and M storage blocks, where M is an integer greater than 0. It should be noted that functions of the host 201 may include all functions of the host 10 in FIG. 1A, functions of the storage device 202 may include all functions of the storage device 103 in FIG. 1A, the controller 2021 may be the storage controller 1033 in FIG. 1A, and the storage block is a storage medium in the storage device 202.

The controller 2021 is configured to determine region configuration information, where the region configuration information includes a quantity N of storage regions, sizes of the storage regions, and maximum data retention time periods corresponding to the storage regions, and N is an integer greater than 1. Specifically, before the controller 2021 of the storage device 202 (for example, an external memory) partitions multiple storage blocks, the region configuration information needs to be first determined, that is, a quantity of storage regions into which the storage medium needs to be divided, a quantity of storage blocks that need to be included in each storage region (that is, a size of the storage region), and a maximum data retention time period corresponding to each storage region are first determined. For example, it may be determined, based on a user model, that a ratio of user data to swap data is 7:3, and retention time period requirements of the two types of data are respectively 40° C. 1 Year (a maximum retention time period of one year in an environment of 40 degrees Celsius (C)) and 40° C. 1 Month (a maximum retention time period of one month in an environment of 40° C.), so that the storage medium may be divided into two storage regions based on the region configuration information. The first storage region occupies 70% of total space, the second storage region occupies 30% of the total space, a maximum data retention time period of the first storage region is one year, and a maximum data retention time period of the second storage region is one month.

An embodiment of the present disclosure provides a processing apparatus, including a host 201. The host 201 is configured to: generate region configuration information, where the region configuration information includes a quantity N of storage regions, sizes of the storage regions, and maximum data retention time periods corresponding to the storage regions, and N is an integer greater than 1; and send the region configuration information to a storage device 202, where the region configuration information is used by the storage device to divide M storage blocks into N storage regions, each storage region corresponds to one maximum data retention time period, and M is an integer greater than 1.

Figure 3:
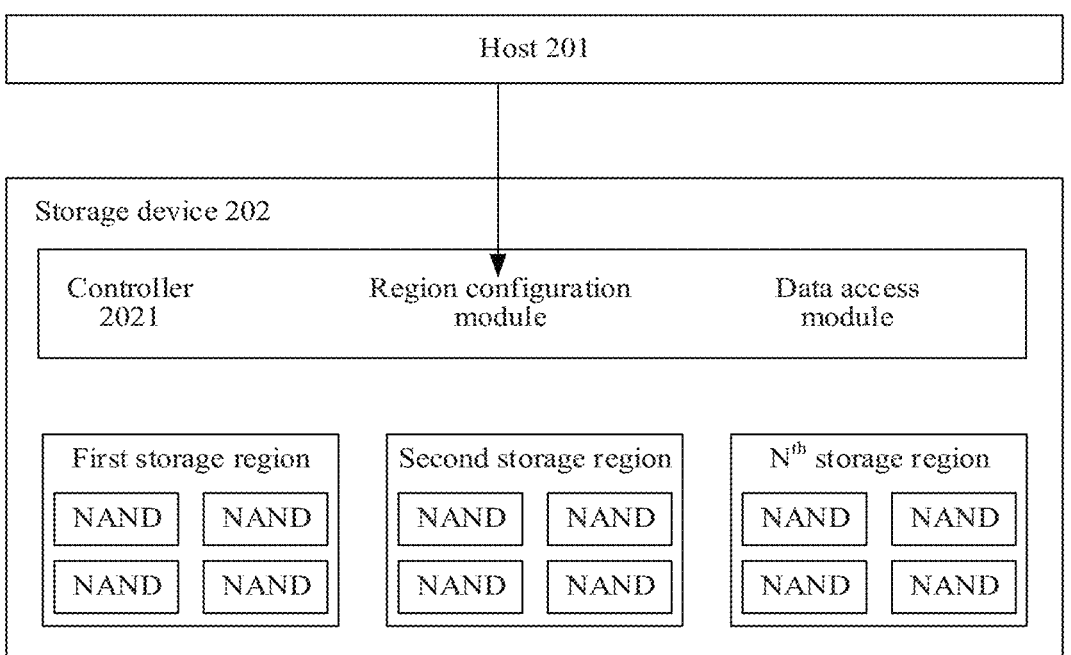
FIG. 3 is a diagram of data exchange between a host and a storage device according to an embodiment of the present disclosure.

In a possible implementation, the controller 2021 is further configured to: receive the region configuration information sent by the host 201, or negotiate with the host 201 for the region configuration information. Specifically, the region configuration information may be generated by the host 201 based on a requirement of the host 201 side and delivered to the storage device 202, or may be obtained through negotiation between the storage device 202 and the host 201, so that the controller 2021 of the storage device 202 can partition the storage blocks based on the configuration information. In addition, the controller 2021 may further implement, through software configuration, different maximum data retention time periods for different storage regions, so that the controller 2021 can store data based on multiple storage regions, improving utilization and prolonging a service life of an external memory. For example, as shown in FIG. 3, FIG. 3 is a diagram of data exchange between a host and a storage device according to an embodiment of the present disclosure. A region configuration module may be added to a controller 2021 of a storage device 202 in the figure, and is configured to receive region configuration information sent by a host 201. Further, the region configuration module may perform storage region partitioning based on the region configuration information.

The controller 2021 is further configured to divide M storage blocks into N storage regions based on a quantity N of storage regions and sizes of the storage regions, where each of the N storage regions includes one or more blocks. The storage block is a storage medium in the storage device 202, and is configured to actually store data. Specifically, after determining the region configuration information, the controller 2021 of the storage device 202 first divides multiple storage blocks into N storage regions based on the quantity N of regions and the sizes of the regions in the region configuration information, where each storage region may include one or more storage blocks. For example, as shown in FIG. 3, a region configuration module may be added to the controller 2021. The region configuration module may divide the multiple storage blocks into N storage regions (for example, a first storage region, a second storage region, an Nth storage region, and the like in FIG. 3) based on the quantity N of regions and the sizes of the regions in the region configuration information, where it should be noted that a NAND in the figure may include one or more storage blocks).

Figures 4, 5:
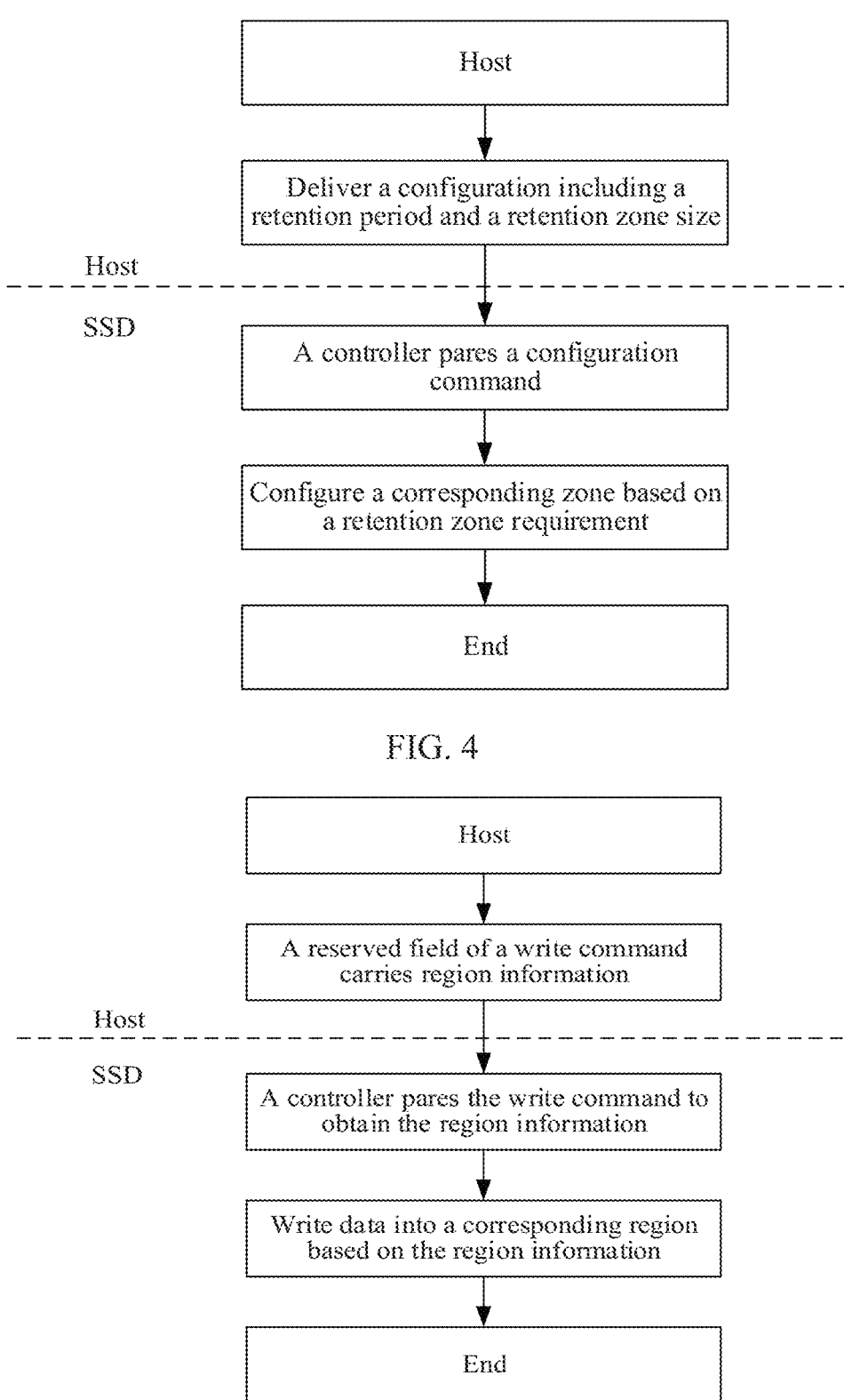
FIG. 4 is a schematic flowchart of configuring a storage region by a storage device according to an embodiment of the present disclosure.
FIG. 5 is a schematic flowchart of data writing according to an embodiment of the present disclosure.

The controller 2021 is further configured to configure a maximum data retention time period for each of the N storage regions based on the region configuration information. Specifically, the controller 2021 configures the maximum data retention time period for each of the N storage regions based on the maximum data retention time periods corresponding to the storage regions. For a storage block, a maximum data retention time period may be configured by using software, to implement different maximum data retention time periods for different storage regions. Therefore, the controller 2021 may store data based on multiple storage regions, improving utilization and prolonging a service life of an external memory. For example, as shown in FIG. 4, FIG. 4 is a schematic flowchart of configuring a storage region by a storage device according to an embodiment of the present disclosure. In the figure, a host 201 allocates a corresponding storage zone size and a retention time period requirement to a storage device 202 (for example, an external memory) according to a requirement. After obtaining a configuration command, the SSD parses the command, and obtains the storage zone size and the corresponding retention time period requirement. The SSD allocates, according to the storage zone size, blocks of the corresponding size to form a storage region, and configures a corresponding maximum data retention time period for each storage region.

In a possible implementation, the controller 2021 is further configured to: configure, based on the maximum data retention time period corresponding to each storage region, a maximum quantity of program/erase cycles of a block included in each storage region, where a shorter maximum data retention time period corresponding to a storage region indicates a larger maximum quantity of program/erase cycles of a block included in the storage region. Specifically, for a storage block, a shorter maximum data retention time period is configured, less hardware wear is caused to the storage block each time data is written. Therefore, a larger quantity of program/erase cycles may be configured, to improve utilization of the storage block. On the contrary, a longer maximum data retention time period is configured, greater hardware wear is caused to the storage block each time data is written. To ensure that to-be-stored data is not lost, a smaller quantity of program/erase cycles may be configured, to avoid reduced data stability due to excessive erasion of a storage block, improve utilization and prolong a service life of an external memory. In addition, because a maximum data retention time period of a block in the present disclosure is configured by using software, personalized hardware customization with an external memory manufacturer is not needed, so that a service life of an external memory can be prolonged without increasing costs, reducing available space, and affecting reliability of data.

In a possible implementation, the storage system further includes a host 201. The host 201 is further configured to: select a target storage region from the N storage regions based on requirement information of to-be-stored data, where the requirement information includes a target retention time period expected by the to-be-stored data, the maximum data retention time period corresponding to the target storage region is greater than or equal to the target retention time period, and each storage region corresponds to one piece of region identification information; and send a write command to the controller 2021, where the write command includes the to-be-stored data and target region identification information of the target storage region. Specifically, the host 201 selects, from multiple storage regions based on the target retention time period required by the to-be-stored data, a target region whose maximum data retention time period is greater than or equal to the target retention time period. Further, when the host 201 delivers the write command, the write command needs to include the to-be-stored data, and needs to carry information used to identify the target storage region, so that after receiving the write command, the storage device 202 can store the to-be-stored data in the target storage region, implementing data storage according to a target retention time period of to-be-stored data, avoiding a waste of storage resources caused by storing all data according to a same and longest maximum data retention time period, improving utilization, and prolonging a service life of an external memory. For example, as shown in FIG. 5, FIG. 5 is a schematic flowchart of data writing according to an embodiment of the present disclosure. In the figure, a host carries region information (that is, region identification information) in a reserved field of a command according to a retention time period requirement of data to be written. After receiving the command, an SSD controller 2021 first performs parsing to obtain corresponding region information, and obtains location information for data writing according to configuration information. Finally, the SSD writes the data into a corresponding storage region in to a NAND flash according to the command information of the host.

In some technical solutions, a target retention time period of to-be-stored data is first predicted to obtain a predicted value, and then a programming voltage of a storage block is controlled based on the predicted value. If the predicted value deviates greatly from an actual value, critical data is lost and the storage block does not meet a retention time period requirement. However, in this embodiment of the present disclosure, different maximum data retention time periods for all storage regions are first configured in a unified manner, and then data having a corresponding retention time period requirement is scheduled to a storage region with a matching maximum data retention time period. In addition, it is ensured that a maximum data retention time period of a target storage region may be greater than or equal to a target retention time period of to-be-stored data. Even if an error is present in a target retention time period of a part of the to-be-stored data, impact is caused only on the part of data, and data stability can be ensured to some extent, without causing a waste of resources in the entire storage region.

In a possible implementation, the host 201 is further configured to: determine the target retention time period based on a data type of the to-be-stored data, where the data type includes but is not limited to one or more of the following: temporary data generated in a process of using an application, stack data corresponding to an anonymous page of a background application, and data that can be discarded after an application is closed. Specifically, because the host 201 has different requirements for accessing different types of data, data retention time periods required by different types of data may be different. Therefore, the host 201 may determine the required target retention time period based on a data type of the to-be-stored data, and then determine the target storage region based on the target retention time period, so that the storage device 202 can store the to-be-stored data in the target storage region after receiving the write command, implementing data storage according to a target retention time period of to-be-stored data, avoiding a waste of storage resources caused by storing all data according to a same and longest maximum data retention time period, improving utilization, and prolonging a service life of an external memory. For example, the to-be-stored data is temporary data generated in a process of using an application program, or stack data corresponding to an anonymous page of a background application, or data whose life cycle is limited to a startup phase of an application and that can be discarded after the application is closed. Because this type of data requires a shorter retention time period than normal data, it may be determined that the target retention period of the to-be-stored data is shorter.

In a possible implementation, the controller 2021 is further configured to: receive a write command sent by the host 201, where the write command includes the to-be-stored data and target region identification information of the target storage region, the target storage region is one of the N storage regions, and each storage region corresponds to one piece of region identification information; and write the to-be-stored data into the target storage region based on the target region identification information in the write command. Specifically, after the controller 2021 in the storage device 202 divides the multiple storage blocks into N storage regions based on the region configuration information, the write command received by the controller 2021 includes the to-be-stored data and the target region identification information, so that the controller 2021 may store the to-be-stored data in the target storage region based on the target region identification information, implementing data storage according to a target retention time period of to-be-stored data, avoiding a waste of storage resources caused by storing all data according to a same and longest maximum data retention time period, improving utilization, and prolonging a service life of an external memory.

In conclusion, in this embodiment of the present disclosure, in a process in which the host 201 (HOST) exchanges parameters and data with the storage device 202 (for example, the external memory), the controller 2021 inside the SSD manages data arrangement and related configuration in the NAND flash, and undertakes processing of a command delivered by the host. It should be noted that, in this embodiment of the present disclosure, function submodules including a region configuration module (Region Config) and a data access module (Data Access) may be added to the controller 2021, so that maximum data retention time periods of different regions may be configured and different regions may be accessed by using these function submodules. The region configuration module divides the NAND flash into different regions, to meet requirements of the host for different retention time periods.

In a possible implementation, the controller 2021 is further configured to: generate a corresponding region identifier for each storage region, and establish a mapping relationship between a maximum data retention time period of each storage region and a corresponding region identifier. Optionally, the controller 2021 is further configured to send the mapping relationship to the host 201. Specifically, after dividing the multiple storage blocks into N storage regions based on the region configuration information, the controller 2021 in the storage device 202 may further generate a region identifier for each storage region, so that one region identifier corresponds to one storage region. Subsequently, a mapping relationship between a maximum data retention time period of each storage region and a region identifier may be established, and then the mapping relationship between a maximum data retention time period of each of the N storage regions and a region identifier is sent to the host 201, so that when generating a write command, the host 201 can select a target storage region based on the target retention time period of the to-be-stored data, and use a region identifier of the target storage region as region identification information. For example, it is assumed that the storage device 202 includes two storage regions, a maximum data retention time period of a first storage region is one year, and a maximum data retention time period of a second storage region is three days. The storage device 202 may generate a region identifier for each storage region, and establish a mapping relationship between a maximum data retention time period and a region identifier for each storage region. For example, a region identifier of the first storage region is 001 and the identifier is associated with the maximum data retention time period of one year, and a region identifier of the second storage region is 002 and the identifier is associated with the maximum data retention time period of three days. Then, the storage device 202 sends the mapping relationship between the two region identifiers and the maximum data retention time period to the host 201, so that the host 201 selects one from the two storage regions as the target storage region based on the target retention time period of the to-be-stored data.

In a possible implementation, the host 201 is specifically configured to: determine, from the N storage regions, a storage region whose maximum data retention time period is greater than or equal to the target retention time period as the target storage region; and send a write command to the controller 2021, where the write command includes the to-be-stored data and a target region identifier corresponding to the target storage region. Specifically, after the host 201 obtains a mapping relationship between a maximum data retention time period of each of the N storage regions and a region identifier, the host 201 may determine, from the N storage regions based on the target retention time period of the to-be-stored data, a storage region whose maximum data retention time period is greater than or equal to the target retention time period as the target storage region. Further, when generating the write command for the to-be-stored data, the host 201 may use the region identifier corresponding to the target storage region as the region identification information, so that after receiving the write command, the storage device 202 can store the to-be-stored data in the target storage region based on the region identifier, implementing data storage according to a target retention time period of to-be-stored data, avoiding a waste of storage resources caused by storing all data according to a same and longest maximum data retention time period, improving utilization, and prolonging a service life of an external memory.

In a possible implementation, the write command further includes a target logical address, the target logical address is any address in an available logical address space of the storage system, the target logical address is used to establish a mapping relationship with a target physical address in the target storage region, and the target physical address is a physical address at which the to-be-stored data is actually stored in the target storage region. Specifically, if each storage region has a unique region identifier, the region identifier may be used as the region identification information. In this case, in addition to the to-be-stored data and the target region identification information, the write command further needs to include a logical address, so that the host 201 can subsequently read data from the storage device 202 based on the logical address.

Figure 6:
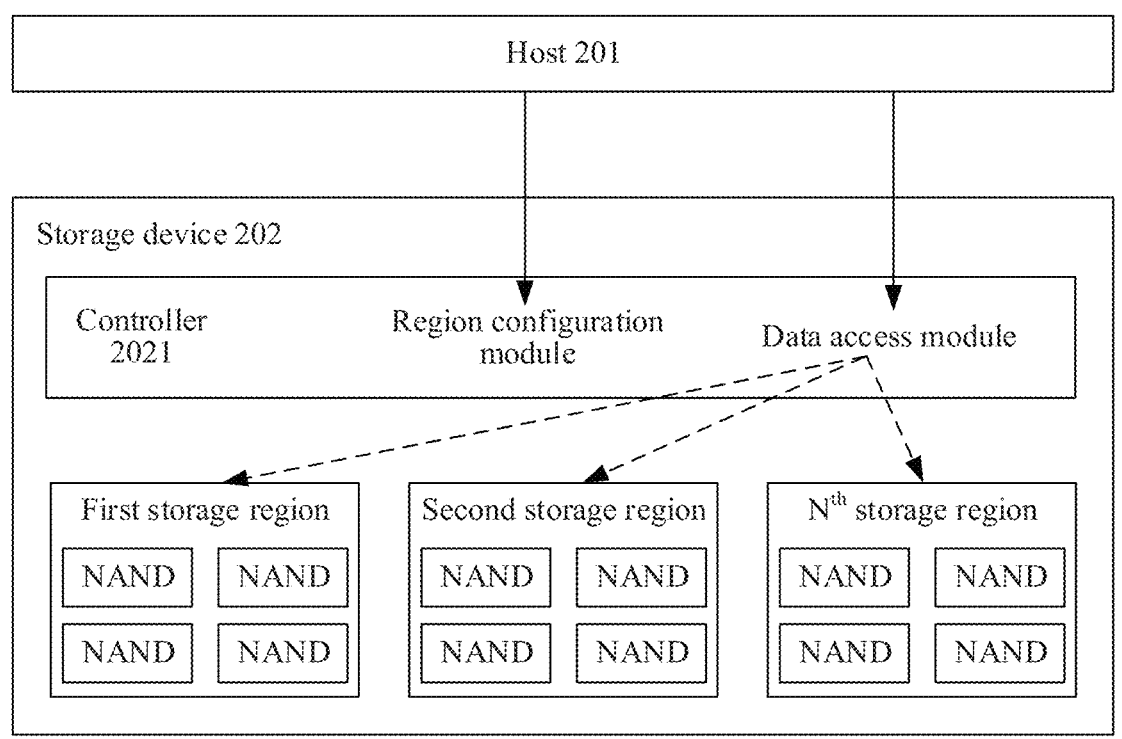
FIG. 6 is a diagram of partitioned data management according to an embodiment of the present disclosure.

For example, as shown in FIG. 6, FIG. 6 is a diagram of partitioned data management according to an embodiment of the present disclosure. A host side in the figure may obtain, through division based on a characteristic of data (that is, data with different characteristics may require different target retention time periods), different zones, including a common region corresponding to normal user data and a loosened retention (LR) time period region LR Region 1 to N. Further, an SSD side may be notified of, through configuration, division and management of storage regions. When data is written, region identification information (including but not limited to a characteristic identifier, a logical address range, and the like) needs to be carried to notify the SSD of a location for data writing.

It should be noted that, in this example, a storage region configuration process is as follows. First, the host may determine a required zone and a corresponding retention time period based on a data type. Next, the host 201 may deliver a region quantity (Region number), and a region size and a retention time period requirement of each region to a storage device 202 (for example, an external storage) by using a user-defined command or a protocol reserved field. Further, an SSD controller 2021 parses the configuration command of the host to obtain the corresponding region quantity, and the region size and the retention time period of each region, and may store the region quantity, and the region size the retention time period of each region in a region configuration module (Region Config) in the controller 2021. Then, the SSD controller 2021 allocates specific blocks based on each region size, to form corresponding storage regions. If a quantity of remaining available blocks meets a region size requirement, the SSD controller 2021 allocates a corresponding quantity of blocks based on the region size and records an allocation result, and the SSD controller 2021 returns a setting success to the host. If the quantity of remaining available blocks is insufficient to meet the region size requirement, the SSD controller 2021 returns a setting failure.

It should be further noted that, in this example, a data writing process is as follows. First, the host attaches a region number (that is, region identification information) to a retention field of a write command based on a type of to-be-stored data, and delivers the write command to the SSD through frame assembly. Next, when receiving the write command delivered by the host, the SSD parses the write command for a corresponding region number (that is, a region identifier). Further, the SSD controller 2021 queries corresponding region config information, and determines whether the region config information matches a region number in the write command delivered by the host. If corresponding region information is found, the SSD controller 2021 obtains a writable location of the corresponding region, and writes data into the corresponding region. If no corresponding region information is found, the SSD controller 2021 writes the data into a common region, and processes the data as normal user data. Finally, the SSD controller 2021 returns a write success to the host. Optionally, if the write command delivered by the host 201 fails to match a region, the SSD may choose to return a write failure to the host. For example, it is assumed that the write command includes to-be-stored data and a target region identifier 001. After receiving the write command, the SSD parses the write command and identifies the target region identifier 001, and then stores the to-be-stored data in a storage region corresponding to 001.

Compared with some technology, in this embodiment of the present disclosure, a physical medium of a storage block does not need to be adjusted, and no additional customization is required. Therefore, no additional cost is brought. In this embodiment of the present disclosure, SLC/TLC mode switching is not used for a write amount. Therefore, available space of a user is not affected. In this embodiment of the present disclosure, partition management is performed according to a data type on the host 201 side with reference to a service characteristic (that is, data retention time periods for data of different types may be different), to avoid a problem of data loss.

In a possible implementation, the controller 2021 is further configured to: divide an available logical address space of the storage system into N logical address segments; and establish a mapping relationship between a maximum data retention time period of each storage region and one of the N logical address segments. Optionally, the controller 2021 is further configured to send the mapping relationship to the host 201. Specifically, after dividing the multiple storage blocks into N storage regions based on the region configuration information, the controller 2021 in the storage device 202 may further divide an available logical address space of the storage system into N logical address segments, so that one logical address segment corresponds to one storage region. Next, a mapping relationship between a maximum data retention time period of each storage region and a logical address segment may be established, and then the mapping relationship between a maximum data retention time period of each of the N storage regions and a logical address segment is sent to the host 201, so that when generating a write command, the host 201 can select a target storage region based on the target retention time period of the to-be-stored data, and use a logical address segment of the target storage region as region identification information. For example, it is assumed that the storage device 202 includes two storage regions, a maximum data retention time period of a first storage region is one year, and a maximum data retention time period of a second storage region is three days. The storage device 202 divides the available logical address space in the storage system into two logical address segments, and establishes a mapping relationship between a maximum data retention time period and each logical address segment. For example, a logical address segment of the first storage region is logical block address (LBA) 0 to LBAm, and the logical address segment is associated with the maximum data retention time period of one year, and a logical address segment of the second storage region is LBA m+1 to LBAn, and the logical address segment is associated with the maximum data retention time period of three days. Then, the storage device 202 sends the mapping relationship between the two region identifiers and the maximum data retention time period to the host 201, so that the host 201 selects one from the two storage regions as the target storage region based on the target retention time period of the to-be-stored data.

In a possible implementation, the host 201 is specifically configured to: determine, from the N storage regions, a storage region whose maximum data retention time period is greater than or equal to the target retention time period as the target storage region; determine a target logical address segment corresponding to the target region, and select a target logical address from the target logical address segment; and send a write command to the controller 2021, where the write command carries the to-be-stored data and the target logical address. Specifically, after the host 201 obtains a mapping relationship between a maximum data retention time period of each of the N storage regions and a logical address segment, the host 201 may determine, from the N storage regions based on the target retention time period of the to-be-stored data, a storage region whose maximum data retention time period is greater than or equal to the target retention time period as the target storage region. Further, when generating the write command for the to-be-stored data, the host 201 may select an address, from the logical address segment corresponding to the target storage region, as the target logical address, and use the target logical address as the region identification information, so that after receiving the write command, the storage device 202 can store the to-be-stored data in the target storage region based on the target logical address, implementing data storage according to a target retention time period of to-be-stored data, avoiding a waste of storage resources caused by storing all data according to a same and longest maximum data retention time period, improving utilization, and prolonging a service life of an external memory.

Figure 7:
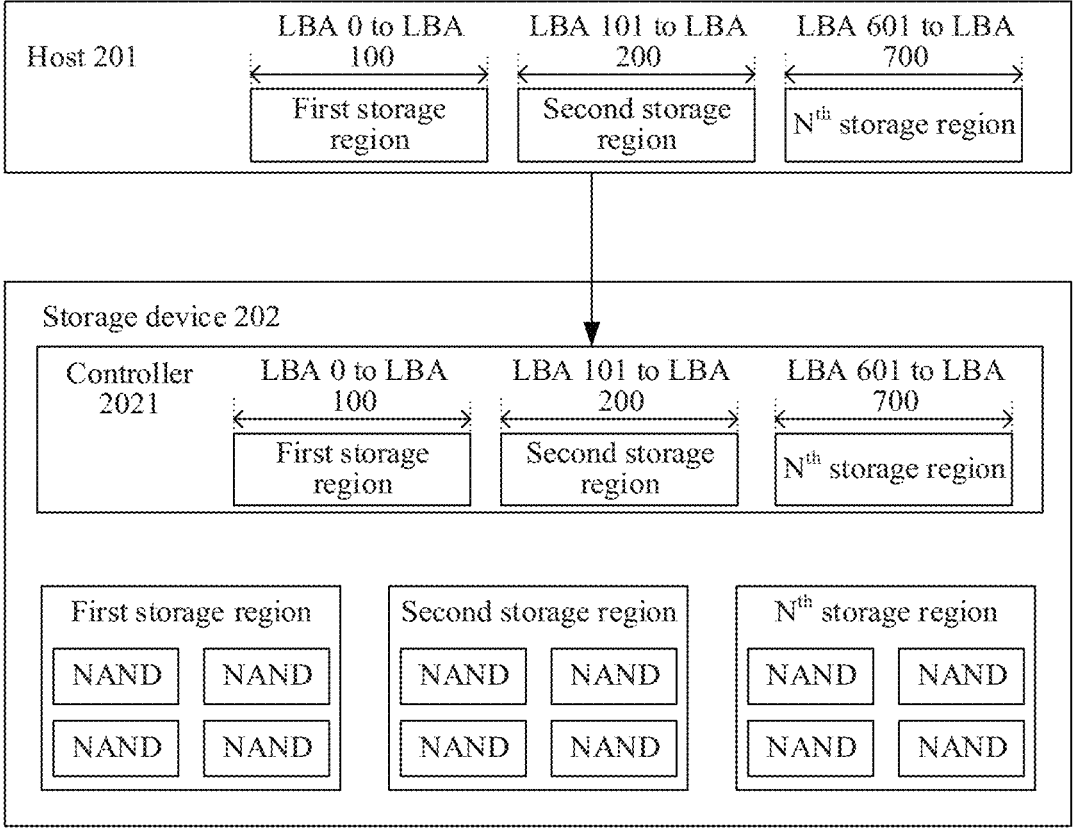
FIG. 7 is another diagram of partitioned data management according to an embodiment of the present disclosure.
Figure 8:
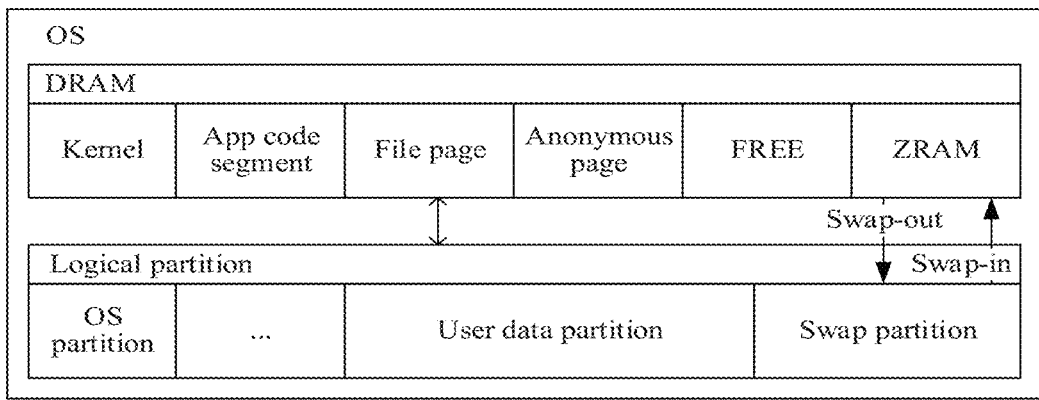
FIG. 8 is a diagram of data partitioning according to an embodiment of the present disclosure.

For example, as shown in FIG. 7, FIG. 7 is another diagram of partitioned data management according to an embodiment of the present disclosure. In the figure, for data of a host, a logical address range is used to identify a retention time period requirement of the data, and an SSD writes data into different regions based on different LBA ranges. As shown in FIG. 8, FIG. 8 is a diagram of data partitioning according to an embodiment of the present disclosure. An operating system (OS) partition may represent a system file, and User Data may represent normal user data, both of which need to be stored in a storage medium according to specifications of 40° C. 1 Year (a maximum data retention time period of one year in an environment of 40° C.). Swap Data corresponds to anonymous page data of a background application in a file system. To reduce burden of a memory (e.g., DRAM), temporary anonymous page data of some background applications is stored in an SSD partition for quick response when the applications are switched back to the foreground. Overall speaking, a retention time period of such data is less than seven days, in addition, when an unexpected power failure occurs, power recovery is not required, causing no impact on user experience of reliability of the entire system. The data can be stored in a swap partition separately to prolong a retention time period and a service life.

It should be noted that, in this example, a storage region configuration process is as follows. First, a ratio of User Data to Swap Data being 7:3 is obtained by the host based on a data type by using a user model, and retention time period requirements are respectively 40° C. 1 Year (a maximum data retention time period of one year in an environment of 40° C.) and 40° C. 1 Month (a maximum data retention time period of one month in an environment of 40° C.). According to a mapping between a retention time period and program/erase (P/E) cycle, a P/E specification corresponding to 40° C. 1 Year is 3000 cycles, and a P/E specification corresponding to 40° C. 1 Month is 8000 cycles (the value varies according to different media and can be adjusted based on an actual situation). To balance between different partitions, the size allocation between User Data and Swap Data needs to meet the following requirement: $7/3000 \times X = 3/8000 \times (1-X)$, and a ratio of User Data to Swap Data is 0.86:0.14. Next, the host 201 may deliver a region quantity (Region number) and an LBA range (a logical address segment of each region) to the SSD by using a user-defined command or a protocol reserved field, and allocate, according to the allocated ratio of region sizes, 86% of the logical addresses as a user data region and 14% of the logical addresses as a swap data region. In this embodiment of the present disclosure, the first 86% may be set as the user data region, and the last 14% may be set as the swap data region. Further, the controller 2021 of the storage device 202 parses the configuration command of the host, obtains the corresponding region quantity and the LBA range to perform region configuration, and stores the region configuration in the controller 2021. Finally, the SSD controller 2021 may return a setting success to the host.

It should be further noted that, in this example, a data writing process is as follows. First, the host applies for space from different logical address ranges based on a data type. In this example, user data is written into a logical address range of 0% to 86% of total space, and Swap Data is written into a logical address range of 86% to 100% of the total space. Next, after receiving the write command of the host, the SSD controller 2021 parses a corresponding logical address LBA and a write length, and manages a write direction of the data according to an agreed logical address partitioning configuration. Further, when identifying a request for writing into a logical address in the range of 0% to 86%, the controller 2021 writes the data into the corresponding common region. Similarly, when identifying a request for writing into a logical address in the range of 86% to 100%, the controller 2021 writes the data into the corresponding swap region. Finally, after writing the data into the NAND Flash according to the logical address LBA information, the SSD returns a write success to the host.

It can be understood that, according to a data ratio of a user, it can be ensured that when the common region is used for 3000 (3K) P/E cycles, the swap region is used for 8000 (8K) P/E cycles. Because of the characteristic of the swap data on the host side, the swap data does not need to be retained when an unexpected power failure occurs. Therefore, after an unexpected power failure occurs, data in the swap region may be cleared, and corresponding recovery and reconstruction are not needed.

In this embodiment of the present disclosure, storage blocks are partitioned by using a controller 2021 of an external memory (for example, an SSD), and different maximum data retention time periods are implemented for different storage regions through software configuration, so that the controller 2021 may store data based on multiple storage regions, improving utilization and prolonging a service life of an external memory. Specifically, the controller 2021 first divides multiple blocks into N storage regions based on configuration information. Further, the controller 2021 configures, by using software based on a maximum data retention time period corresponding to each storage region in the configuration information, a maximum data retention time period of one or more blocks included in each storage region, to implement different maximum data retention time periods for different storage regions. Finally, the controller 2021 may store data in a corresponding storage region based on a retention time period required by to-be-stored data, avoiding a waste of hardware resources caused by configuring all storage blocks according to a same maximum data retention time period, improving utilization and prolonging a service life of an external memory. In addition, the storage blocks are partitioned for use. This facilitates data management, and is conducive to retention and maintenance of overall performance of the storage device 202. In addition, because a maximum data retention time period of a block in the present disclosure is configured by using software, personalized hardware customization with an external memory manufacturer is not needed, so that a service life of an external memory can be prolonged without increasing costs, reducing available space, and affecting reliability of data.

The storage system in embodiments of the present disclosure is described in detail above, and a related method in embodiments of the present disclosure is provided below.

Figure 9:
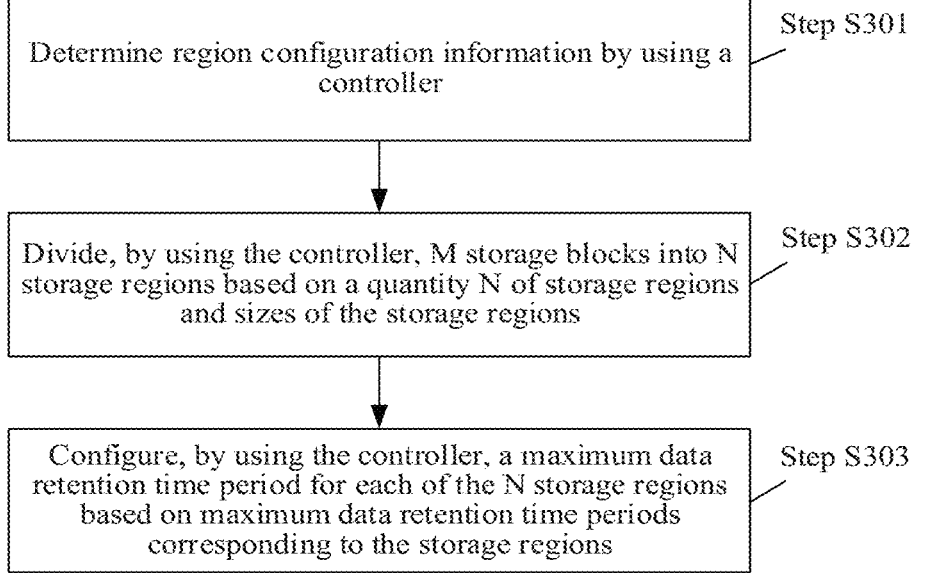
FIG. 9 is a flowchart of a partitioned data management method according to an embodiment of the present disclosure.

Refer to FIG. 9. FIG. 9 is a flowchart of a partitioned data management method according to an embodiment of the present disclosure. The method is applicable to a storage system in FIG. 2 and a device including the storage system. The method may include the following steps S301 to S303. The storage system includes a storage device, the storage device includes a controller and M storage blocks, and M is an integer greater than 0. The details are as follows.

Step S301: Determine region configuration information by using the controller.

Specifically, the region configuration information includes a quantity N of storage regions, sizes of the storage regions, and maximum data retention time periods corresponding to the storage regions, and N is an integer greater than 1.

Step S302: Divide, by using the controller, the M storage blocks into N storage regions based on the quantity N of storage regions and the sizes of the storage regions.

Specifically, each of the N storage regions includes one or more blocks.

Step S303: Configure, by using the controller, the maximum data retention time period for each of the N storage regions based on the maximum data retention time periods corresponding to the storage regions.

In a possible implementation, the method further includes: receiving, by using the controller, the region configuration information sent by a host, or negotiating with the host for the region configuration information.

In a possible implementation, the method further includes: generating, by using the controller, a corresponding region identifier for each storage region, and establishing a mapping relationship between a maximum data retention time period of each storage region and a corresponding region identifier.

In a possible implementation, the method further includes: dividing, by using the controller, an available logical address space of the storage system into N logical address segments; and establishing a mapping relationship between a maximum data retention time period of each storage region and one of the N logical address segments.

In a possible implementation, the method further includes: receiving, by using the controller, a write command sent by the host, where the write command includes to-be-stored data and target region identification information of a target storage region, the target storage region is one of the N storage regions, and each storage region corresponds to one piece of region identification information; and writing the to-be-stored data into the target storage region based on the target region identification information in the write command.

In a possible implementation, the method further includes: configuring, by using the controller based on the maximum data retention time period corresponding to each storage region, a maximum quantity of program/erase cycles of a block included in each storage region, where a shorter maximum data retention time period corresponding to a storage region indicates a larger maximum quantity of program/erase cycles of a block included in the storage region.

According to the method provided in this embodiment of the present disclosure, a service life of a storage device can be prolonged.

Figure 10:
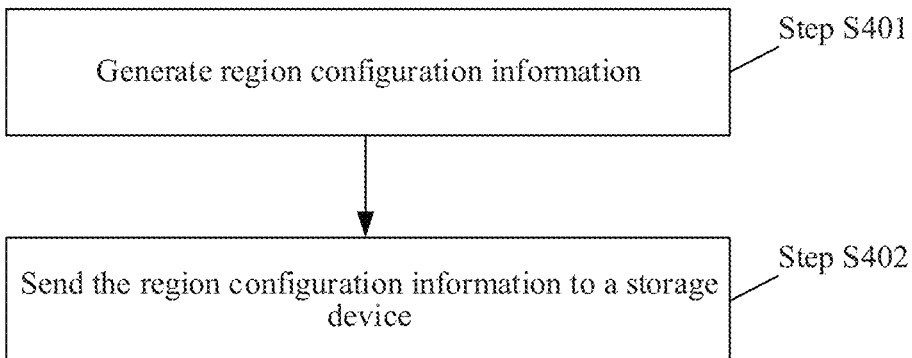
FIG. 10 is a flowchart of another partitioned data management method according to an embodiment of the present disclosure.

Refer to FIG. 10. FIG. 10 is a flowchart of another partitioned data management method according to an embodiment of the present disclosure. The method is applicable to a processing apparatus in FIG. 2 and a device including the processing apparatus. The method may include the following steps S401 and S402. The details are as follows.

Step S401: Generate region configuration information.

Specifically, the region configuration information includes a quantity N of storage regions, sizes of the storage regions, and maximum data retention time periods corresponding to the storage regions, and N is an integer greater than 1.

Step S402: Send the region configuration information to a storage device.

Specifically, the region configuration information is used by the storage device to divide M storage blocks into N storage regions, each storage region corresponds to one maximum data retention time period, and M is an integer greater than 1.

In a possible implementation, the method further includes: selecting a target storage region from the N storage regions based on requirement information of to-be-stored data, where the requirement information includes a target retention time period expected by the to-be-stored data, the maximum data retention time period corresponding to the target storage region is greater than or equal to the target retention time period, and each storage region corresponds to one piece of region identification information; and sending a write command to the storage device, where the write command includes the to-be-stored data and target region identification information of the target storage region.

In a possible implementation, the method further includes: determining the target retention time period based on a data type of the to-be-stored data, where the data type includes one or more of the following: temporary data generated in a process of using an application, stack data corresponding to an anonymous page of a background application, and data that can be discarded after an application is closed.

In a possible implementation, the sending a write command to the storage device includes: determining, from the N storage regions, a storage region whose maximum data retention time period is greater than or equal to the target retention time period as the target storage region; and sending a write command to the storage device, where the write command includes the to-be-stored data and a target region identifier corresponding to the target storage region.

In a possible implementation, the write command further includes a target logical address, the target logical address is any address in an available logical address space, a mapping relationship is present between the target logical address and a target physical address in the target storage region, and the target physical address is a physical address at which the to-be-stored data is actually stored in the target storage region.

In a possible implementation, the sending a write command to the storage device includes: determining, from the N storage regions, a storage region whose maximum data retention time period is greater than or equal to the target retention time period as the target storage region; determining a target logical address segment corresponding to the target region, and selecting a target logical address from the target logical address segment; and sending a write command to the storage device, where the write command carries the to-be-stored data and the target logical address.

The present disclosure provides a computer storage medium. The computer storage medium stores a computer program, and when the computer program is executed by a processor, any one of the partitioned data management methods is implemented.

An embodiment of the present disclosure provides an electronic device. The electronic device includes a processor, and the processor is configured to support the electronic device to implement a corresponding function in any one of the partitioned data management methods. The electronic device may further include a memory. The memory is configured to be coupled to the processor, and the memory stores program instructions and data that are necessary for the electronic device. The electronic device may further include a communication interface, used for communication between the electronic device and another device or a communication network.

The present disclosure provides a chip system. The chip system includes a processor configured to support an electronic device to implement the function, for example, generating or processing information in the partitioned data management method. In a possible design, the chip system further includes a memory, and the memory is configured to store program instructions and data that are necessary for an electronic device. The chip system may include a chip, or may include a chip and another discrete component.

The present disclosure provides a computer program. The computer program includes instructions, and when the computer program is executed by a computer, the computer is caused to perform the partitioned data management method.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. It should be further appreciated by a person skilled in the art that embodiments described in this specification all belong to example embodiments, and the involved actions and modules are not necessarily required by the present disclosure.

In the several embodiments provided in the present disclosure, it should be understood that the disclosed apparatus may be implemented in other manners. For example, the described apparatus embodiment is merely an example. For example, division into the units is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The foregoing units described as separate parts may or may not be physically separate, and parts displayed as units may or may not be physical units, may be located in one position, or may be distributed on multiple network units. Some or all of the units may be selected based on actual requirements to achieve the objectives of the solutions of embodiments.

In addition, functional units in embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure may be implemented in a form of a software product. The computer software product is stored in a storage medium and includes several instructions for instructing a computer device (which may be a personal computer, a server, or a network device, and may specifically be a processor in a computer device) to perform all or a part of the steps of the foregoing methods described in embodiments of the present disclosure. The foregoing storage medium includes any medium that can store program code, such as a Universal Serial Bus (USB) flash drive, a removable hard disk, a magnetic disk, an optical disc, a read-only memory (ROM), or a random-access memory (RAM).

The foregoing embodiments are merely intended for describing the technical solutions of the present disclosure and not intended to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present disclosure.

What is claimed is:

1. A storage apparatus comprising:
M storage blocks, wherein M is an integer greater than 0; and
a controller configured to:
obtain, from a host device, region configuration information, wherein the region configuration information is based on data features or retention time period requirements and comprises a quantity of storage regions, sizes of the storage regions, and maximum data retention time periods corresponding to the storage regions;
divide the M storage blocks into N storage regions based on the quantity, the sizes, and the maximum data retention time periods in the region configuration information, wherein N is an integer greater than 1 and equal to the quantity and wherein each of the N storage regions comprises one or more storage blocks; and
configure the N storage regions with the maximum data retention time periods in the region configuration information, wherein the maximum data retention time periods determine respective maximum quantities of program/erase cycles for the N storage regions.

2. The storage apparatus of claim 1, wherein the controller is further configured to receive the region configuration information from a host.

3. The storage apparatus of claim 2, wherein the controller is further configured to:
generate region identifiers for the storage regions; and
establish a mapping relationship between the maximum data retention time periods and the region identifiers.

4. The storage apparatus of claim 2, wherein the controller is further configured to:
divide an available logical address space of a storage system into N logical address segments; and
establish a mapping relationship between the maximum data retention time period of each of the N storage regions and the N logical address segments.

5. The storage apparatus of claim 1, wherein the controller is further configured to:
receive, from a host, a write command comprising to-be-stored data and target region identification information of a target storage region, wherein the target storage region is one of the N storage regions; and
write the to-be-stored data into the target storage region based on the target region identification information.

6. The storage apparatus of claim 1, wherein the controller is further configured to configure, based on the maximum data retention time periods, a maximum quantity of program/erase cycles of a storage block comprised in each of the N storage regions, wherein a shorter maximum data retention time period indicates a larger maximum quantity of program/erase cycles of the storage block.

7. An apparatus comprising:
a memory configured to store instructions; and
a processor coupled to the memory and configured to execute the instructions to cause the apparatus to:
    generate, based on data features or retention time period requirements, region configuration information comprising a quantity of storage regions, sizes of the storage regions, and maximum data retention time periods corresponding to the storage regions; and
    send the region configuration information to a storage device, wherein the region configuration information is configured to enable the storage device to divide M storage blocks into N storage regions based on the quantity and the sizes and pre-assigned with the maximum data retention time periods, wherein the maximum data retention time periods determine respective maximum quantities of program/erase cycles for the N storage regions, and wherein M and N are integers greater than 1.

8. The apparatus of claim 7, wherein the processor is further configured to execute the instructions to cause the apparatus to:
    select a target storage region from the N storage regions based on requirement information of to-be-stored data, wherein the requirement information comprises a target retention time period associated with the to-be-stored data; and
    send, to the storage device, a write command comprising the to-be-stored data and target region identification information of the target storage region.

9. The apparatus of claim 8, wherein the processor is further configured to execute the instructions to cause the apparatus to determine, from the N storage regions, a storage region whose maximum data retention time period is greater than or equal to the target retention time period as the target storage region, wherein the maximum data retention time periods comprises the maximum data retention time period, and wherein the target region identification information comprises a target region identifier corresponding to the target storage region.

10. The apparatus of claim 8, wherein the processor is further configured to execute the instructions to cause the apparatus to:
    determine, from the N storage regions, a storage region whose maximum data retention time period is greater than or equal to the target retention time period as the target storage region;
    determine a target logical address segment corresponding to the target storage region; and
    select a target logical address from the target logical address segment, wherein the target region identification information comprises the target logical address.

11. A method comprising:
    obtaining, from a host device, region configuration information, wherein the region configuration information is based on data features or retention time period requirements and comprises a quantity of storage regions, sizes of the storage regions, and maximum data retention time periods corresponding to the storage regions;

dividing M storage blocks into N storage regions based on the quantity, the sizes, and the maximum data retention time periods in the region configuration information, wherein M is an integer greater than 0, wherein N is an integer greater than 1 and equal to the quantity, and wherein each of the N storage regions comprises one or more storage blocks; and
configure the N storage regions with the maximum data retention time periods in the region configuration information, wherein the maximum data retention time periods determine respective maximum quantities of program/erase cycles for the N storage regions.

12. The method of claim 11, further comprising negotiating with the host for the region configuration information.

13. The method of claim 12, further comprising:
    generating region identifiers for the N storage regions; and
    establishing a mapping relationship between a maximum data retention time periods and the region identifiers.

14. The method of claim 12, further comprising:
    dividing an available logical address space of a storage system into N logical address segments; and
    establishing a mapping relationship between a maximum data retention time periods and the N logical address segments.

15. The method of claim 11, further comprising:
    receiving, from a host, a write command comprising to-be-stored data and target region identification information of a target storage region, wherein the target storage region is one of the N storage regions; and
    writing the to-be-stored data into the target storage region based on the target region identification information in the write command.

16. The method of claim 11, further comprising configuring, based on the maximum data retention time periods, a maximum quantity of program/erase cycles of a storage block comprised in each of the N storage regions, wherein a shorter maximum data retention time period indicates a larger maximum quantity of program/erase cycles of the storage block.

17. A method comprising:
    generating, based on data features or retention time period requirements, region configuration information comprising a quantity of storage regions, sizes of the storage regions, and maximum data retention time periods corresponding to the storage regions; and
    sending the region configuration information to a storage device, wherein the region configuration information is configured to enable the storage device to divide M storage blocks into N storage regions based on the quantity and the sizes and pre-assigned with the maximum data retention time periods, wherein the maximum data retention time periods determine respective maximum quantities of program/erase cycles for the N storage regions, and wherein M is an integer greater than 1.

18. The method of claim 17, further comprising:
    selecting a target storage region from the N storage regions based on requirement information of to-be-stored data, wherein the requirement information comprises a target retention time period associated with the to-be-stored data; and
    sending, to the storage device, a write command comprising the to-be-stored data and target region identification information of the target storage region.

19. The method of claim 18, further comprising determining, from the N storage regions, a storage region whose maximum data retention time period is greater than or equal to the target retention time period as the target storage region, and wherein the target region identification information comprises a target region identifier corresponding to the target storage region.

20. The method of claim 18, further comprising:

determining, from the storage regions, a storage region whose maximum data retention time period is greater than or equal to the target retention time period as the target storage region;

determining a target logical address segment corresponding to the target storage region; and selecting a target logical address from the target logical address segment, wherein the target region identification information comprises the target logical address.

\* \* \* \* \*